(12) United States Patent
Kubo et al.

(10) Patent No.: US 7,090,739 B2
(45) Date of Patent: Aug. 15, 2006

(54) METHOD OF MANUFACTURING A SEAT

(75) Inventors: Masayuki Kubo, Yokohama (JP); Kenichi Funayama, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 228 days.

(21) Appl. No.: 10/246,560

(22) Filed: Sep. 18, 2002

(65) Prior Publication Data

US 2003/0051798 A1    Mar. 20, 2003

(30) Foreign Application Priority Data

Sep. 19, 2001   (JP)   ............... 2001-285315

(51) Int. Cl.
*C09J 5/10*   (2006.01)
(52) U.S. Cl. ............... 156/306.6; 156/308.4; 156/309.9; 156/320
(58) Field of Classification Search ............ 156/87, 156/166, 245, 306.6, 320, 308.4, 309.6, 309.9; 297/DIG. 1, DIG. 2, 2
See application file for complete search history.

(56) References Cited

U.S. PATENT DOCUMENTS

| | | | | |
|---|---|---|---|---|
| 3,850,725 A | * | 11/1974 | Spielau et al. | 156/291 |
| 5,486,256 A | * | 1/1996 | Romesberg et al. | 156/251 |
| 5,534,097 A | | 7/1996 | Fasano et al. | 156/214 |
| 5,643,385 A | * | 7/1997 | Kikuchi et al. | 156/212 |
| 5,750,444 A | * | 5/1998 | Jarrell et al. | 442/62 |
| 5,935,364 A | | 8/1999 | Groendal et al. | 156/216 |
| 5,976,685 A | | 11/1999 | Kelly et al. | 428/308.4 |
| 6,074,508 A | * | 6/2000 | Kikuchi et al. | 156/212 |

FOREIGN PATENT DOCUMENTS

| | | |
|---|---|---|
| CN | 02143203.1 | 9/2001 |
| DE | 41 26 188 | 2/1993 |
| EP | 0 791 555 | 8/1997 |
| EP | 0 805 064 | 11/1997 |
| JP | 55-138488 | 10/1980 |
| JP | 61-176387 | 8/1986 |
| JP | 63034122 A | 2/1988 |
| JP | 3-68391 | 3/1991 |
| JP | 2000-334827 | 5/2000 |

OTHER PUBLICATIONS

Search Report dated Oct. 11, 2004 conducted by the European Patent Office from corresponding European Patent Application No. EP 02 25 6439.
Japan Office Action dated Apr. 11, 2005.

* cited by examiner

*Primary Examiner*—Jeff H. Aftergut
*Assistant Examiner*—John L. Goff
(74) *Attorney, Agent, or Firm*—Ohlandt, Greeley, Ruggiero & Perle, L.L.P.

(57) ABSTRACT

Hot-melt webs are located on an outer surface of a pad member and an inner surface of a cover member, individually. The pad member and the cover member are heated to melt the hot-melt webs by means of heaters from the sides opposite the webs, individually. As fibrous hot-melt adhesive elements are cut at every turn and separated to insular pieces, they are distributed like mist drops in the outer surface of the pad member and the inner surface of the cover member. Thereafter, the pad member and the cover member are superposed and pressurized so that they are bonded to each other.

6 Claims, 4 Drawing Sheets

METHOD OF MANUFACTURING A SEAT

CROSS-REFERENCE TO RELATED APPLICATIONS

The present application is claiming priority of Japanese Patent Applications No. 2001-285315, filed Sep. 19, 2001, the entire contents of which are incorporated herein by reference.

BACKGROUND OF INVENTION

1. Field of the Invention

The present invention relates to a method of manufacturing seats used in vehicles such as automobiles, furniture, etc.

2. Description of the Prior Art

In a method of manufacturing an integrally-covered molding seat, a hot-melt adhesive is sometimes used to bond a pad member and a cover member. Known hot-melt adhesives include spreadable adhesives (reactive hot-melt type and the like) and hot-melt sheets (film type and the like).

A spreadable liquid hot-melt adhesive, such as the one described in Jpn. Pat. Appln. KOKAI Publication No. 3-68391(prior art example 1), is cooled after it is spread on a pad member or a cover member.

Thereafter, the pad member and the cover member are superposed and pressurized, and the hot-melt adhesive is heated to be melted with hot air or high-temperature steam. After the adhesive is cooled, the members are released from the mold.

As is described in Jpn. Pat. Appln. KOKAI Publication No. 61-176387 (prior art example 2), on the other hand, a sheet-type hot-melt adhesive or hot-melt sheet is put on the upper surface of a pad member, and a cover member is superposed on the resulting structure. The pad member and the cover member are pressurized and heated with hot air or high-temperature steam so that the hot-melt sheet is melted. Thereafter, the resulting structure is cooled and released from the mold. In the case where the hot-melt sheet of this type is put on the cover member, the hot-melt sheet is usually laminated beforehand to the cover member that is cut and sewn.

In either of the prior art examples 1 and 2, the hot-melt adhesive is heated as it is insufflated with hot air or high-temperature steam from the outside of the cover member or from the inside of the pad member, with the two members superposed.

In the case where the hot-melt adhesive is heated with the hot air from the outside of the cover member, however, the surface of the cover member, if made of a raised fabric, is flattened as it is heated and pressurized. Thus, the surface suffers deterioration in external appearance, such as whitening. In the case where the hot-melt adhesive is heated with the hot air from the inside of the pad member, on the other hand, the thermal efficiency is very poor, and besides, the pad member may possibly be degraded by heat. Further, heating and cooling devices must be incorporated into a mold for pressurizing the pad member and the cover member, so that the construction of the mold is complicated.

In the prior art examples 1 and 2, the hot-melt adhesive is melted by heating the pad member and the cover member that are pressurized against each other. Therefore, the hot-melt adhesive is bound on the interface between the pad member and the cover member as it is melted. Thus, the melted hot-melt adhesive becomes a continuous film or net between the pad member and the cover member as it hardens. Thus, the surface portion of the cooled (or bonded) cover member is too rigid to be pleasant to the touch.

SUMMARY OF THE INVENTION

The present invention has been contrived in consideration of these circumstances, and its object is to provide a method of manufacturing a seat using a hot-melt adhesive and having an improved surface touch.

A method of manufacturing a seat according to the present invention, in which a pad member and a cover member are bonded with use of hot-melt adhesive elements, comprises: putting a hot-melt web, formed of the weblike hot-melt adhesive elements, on an outer surface of the pad member and/or an inner surface of the cover member; heating the pad member or the cover member from the side opposite the hot-melt web, thereby melting the hot-melt adhesive elements and distributing the melted hot-melt adhesive elements like mist drops in the outer surface of the pad member and/or the inner surface of the cover member; and superposing and pressurizing the pad member and the cover member to bond the same to each other after distributing the hot-melt adhesive elements like mist drops by the heating.

According to the present invention, the fibrous hot-melt adhesive elements are dispersed in the form of a large number of insular pieces as they are heated before the pad member and the cover member are contact bonded. More specifically, the melted hot-melt adhesive elements are cut at every turn and separated to the independent insular pieces by surface tension so that the hot-melt adhesive elements can be distributed like mist drops in the outer surface of the pad member and/or the inner surface of the cover member. Thereafter, the pad member and the cover member are contact-bonded to each other.

Thus, the respective joint surfaces of the pad member and the cover member are bonded to each other at a large number of points with use of the hot-melt adhesive elements that are distributed like mist drops.

According to this invention, the surface of the resulting seat, having the pad member and the cover member bonded with the hot-melt adhesive elements, is pleasant to the touch.

Preferably, according to this invention, the outer surface of the pad member and the inner surface of the cover member are each provided with the hot-melt web with a density of 40 g/m$^2$, and the hot-melt adhesive elements are distributed like mist drops in both the outer surface of the pad member and the inner surface of the cover member by the heating. In this case, the pad member and the cover member can be bonded more securely to each other, and an integrally covered molding seat with a further improved surface touch can be obtained.

Additional objects and advantages of the invention will be set forth in the description which follows, and in part will be obvious from the description, or may be learned by practice of the invention. The objects and advantages of the invention may be realized and obtained by means of the instrumentality and combinations, thereof particularly pointed out hereinafter.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DETAILED DESCRIPTION OF THE INVENTION

Figure 1:
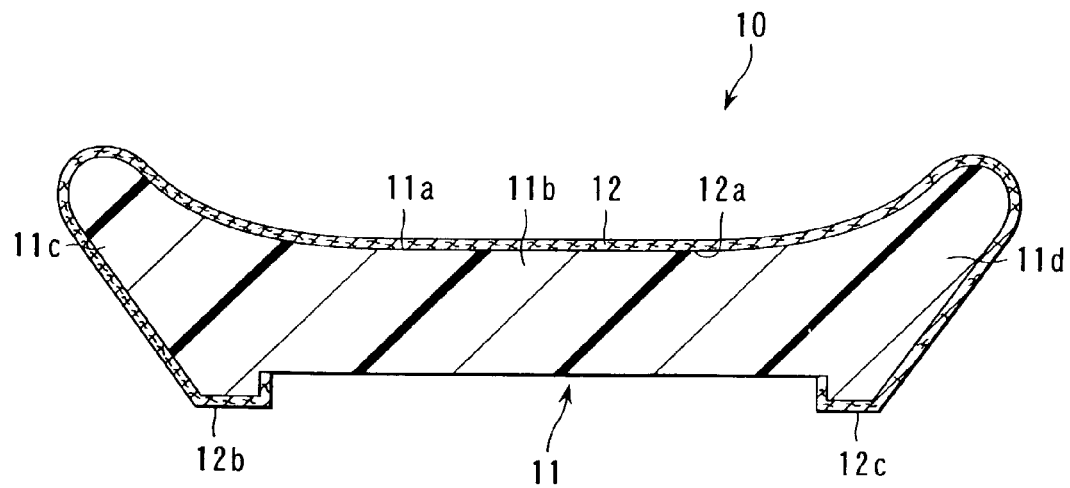
FIG. 1 is a sectional view of a seat according to an embodiment of the invention.

An embodiment of the present invention will now be described with reference to FIGS. 1 to 8. An integrally-covered molding seat 10 for automobile shown in FIG. 1 includes a pad member 11 and a cover member 12. The pad member 11 is formed of plastic foam such as urethane foam and has a given shape.

The pad member 11 includes a main portion 11b having an outer surface 11a, side support portions 11c and 11d formed swelling individually on the opposite sides of the main portion 11b, etc.

The cover member 12 is formed having a given shape by cutting and sewing a covering material selected from various materials such as a woven fabric, leather, knit fabric, etc. If necessary, a winding or support member may be provided on an inner surface 12a of the cover member 12. On the reverse side of the pad member 11, terminal end portions 12b and 12c of the cover member 12 are anchored under tension to a frame (not shown) or the like.

The pad member 11 and the cover member 12 are bonded to each other with a hot-melt adhesive, which will be mentioned later. Manufacturing processes for the seat 10 will now be described with reference to FIGS. 2 to 8.

Figure 2:
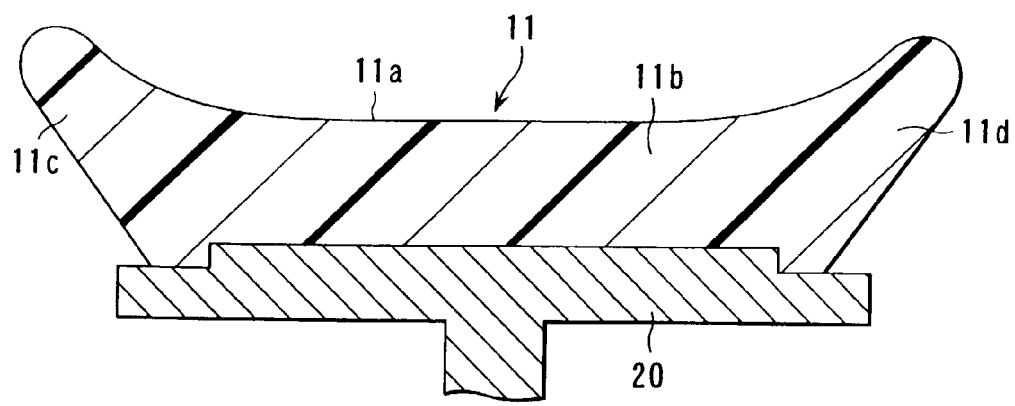
FIG. 2 is a sectional view showing the way a pad member used in the seat shown in FIG. 1 is supported on a pressure mold.

As shown in FIG. 2, the pad member 11 is fixed on a pressure mold 20. The pad member 11 is previously formed into a given shape in a molding process.

Figure 3:
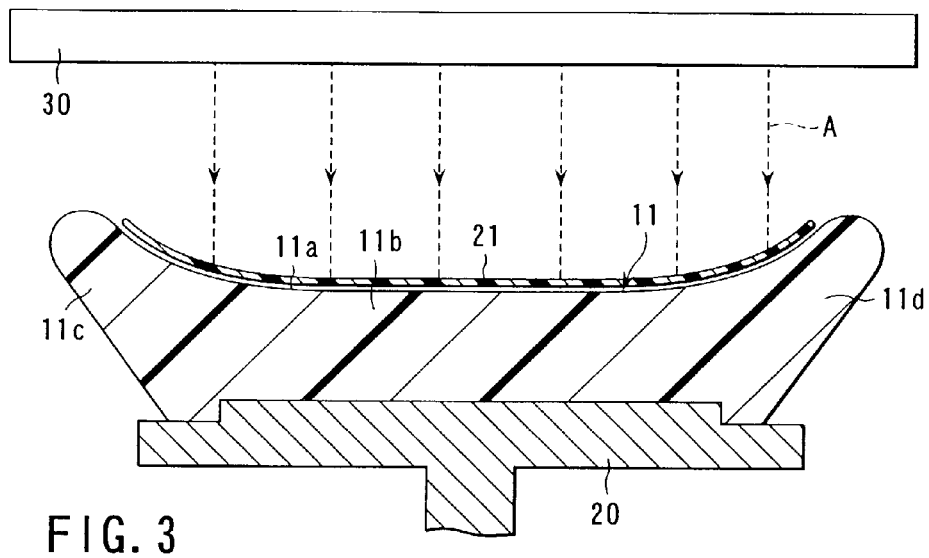
FIG. 3 is a sectional view showing the way a hot-melt web is laid on the pad member shown in FIG. 1.
Figure 7:
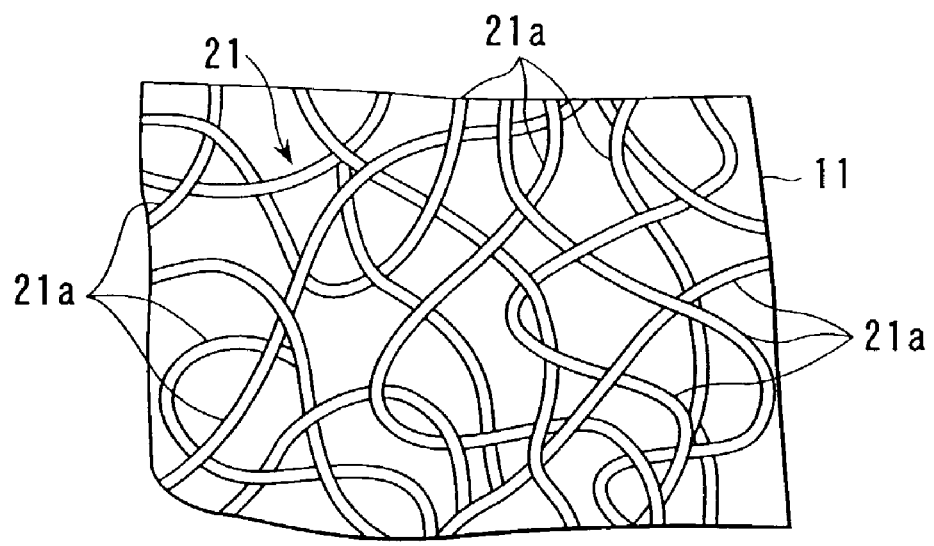
FIG. 7 is an enlarged view typically showing a part of the hot-melt web.

As shown in FIG. 3, a hot-melt web 21 is put on the outer surface 11a of the pad member 11. FIG. 7 is an enlarged view showing a part of the web 21. The hot-melt web 21 is obtained by molding a large number of fibrous hot-melt adhesive elements 21a of, for example, a nylon- or polyester-based thermoplastic resin into a porous web structure.

Figure 4:
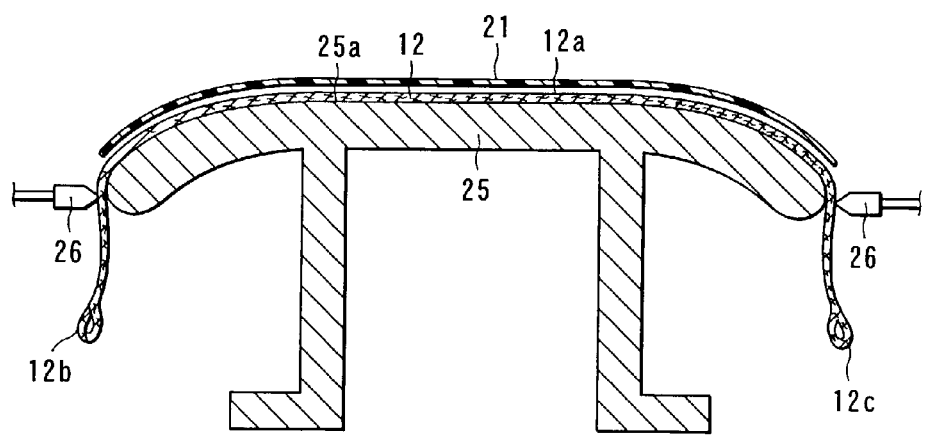
FIG. 4 is a sectional view showing the way a cover member used in the seat shown in FIG. 1 is supported on a molding tool.

As shown in FIG. 4, the cover member 12 is set on an upper surface 25a of a molding tool 25 with its inner surface 12a upward, and the end portions of the cover member 12 are restricted by clamp members 26, individually. The upper surface 25a of the molding tool 25 has a shape corresponding to the outer surface 11a of the pad member 11.

The hot-melt web 21 is located also on the inner surface 12a of the cover member 12. Preferably, the web 21 on the cover member 12 should be laminated to the inner surface 12a of the cover member 12 in advance. Preferably, the METSUKE (grams per square meter) of the hot-melt web 21 should be 40 g/m$^2$ or less.

Figure 5:
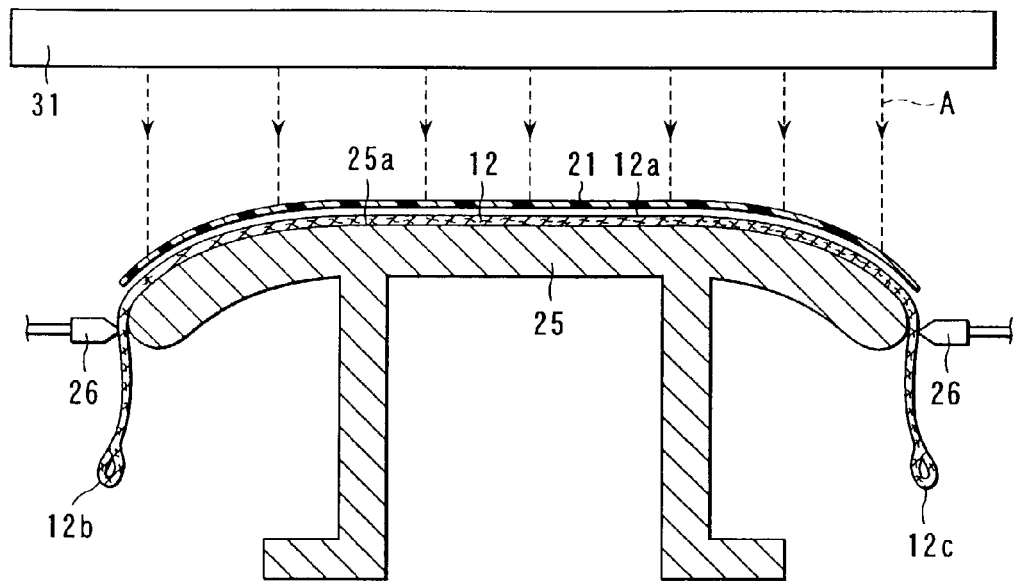
FIG. 5 is a sectional view showing the way the hot-melt web is laid on the cover member shown in FIG. 4.

In a heating process, the hot-melt web 21 is heated to be melted by means of a heat source such as a heater 30 from above the pad member 11 or from the side opposite the web 21, as shown in FIG. 3. As shown in FIG. 5, moreover, the web 21 is heated to be melted by means of a heat source such as a heater 31 from above the cover member 12 or from the side opposite the web 21. The heat source may be any other heating means than the heaters 30 and 31. In FIG. 3, arrows A typically indicate heat rays.

Figure 8:
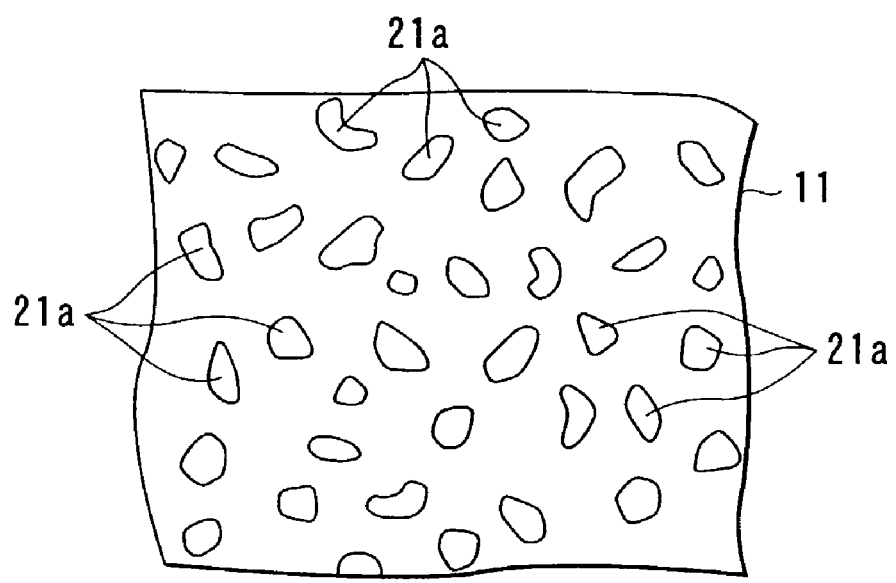
FIG. 8 is a view typically showing a melted state of the hot-melt web shown in FIG. 7.

In the molted hot-melt web 21, the hot-melt adhesive elements 21a (shown in FIG. 7) having so far been fibriform are cut at every turn and reduced to independent insular pieces by surface tension or the like that is caused by melting, as shown in FIG. 8. The numerous insular hot-melt adhesive elements 21a are distributed like mist drops in the outer surface 11a of the pad member 11 and the inner surface 12a of the cover member 12.

Figure 6:
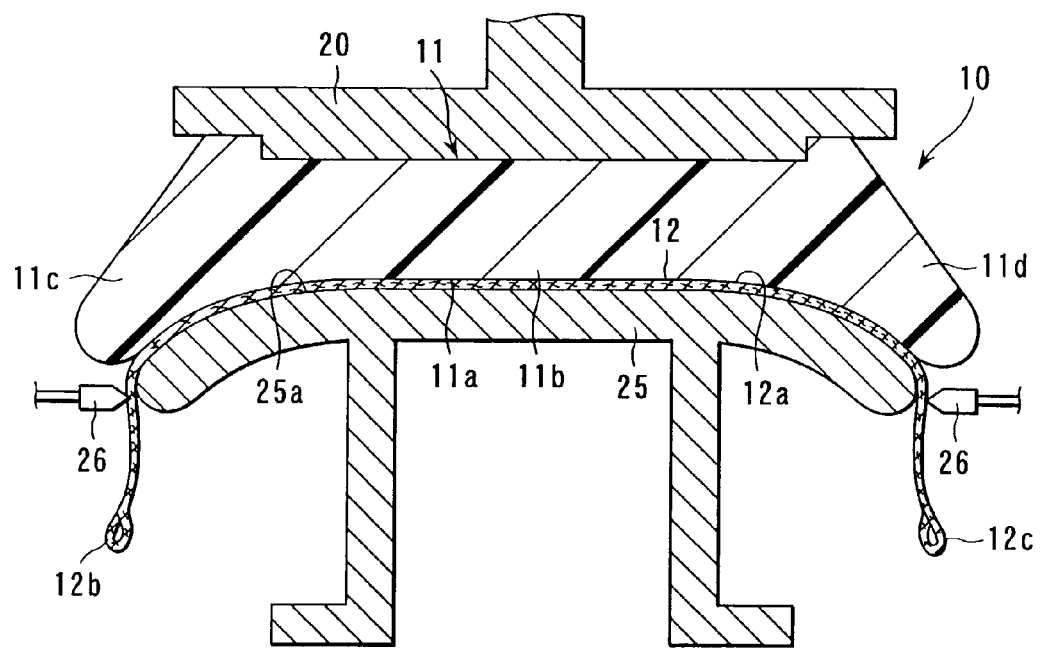
FIG. 6 is a sectional view showing the pad member and the cover member contact-bonded to each other.

After the hot-melt adhesive elements 21a are scattered like mist drops in both the pad member 11 and the cover member 12 in the heating process, the members 11 and 12 are superposed on each other in a pressurizing process shown in FIG. 6. The pad member 11 and the cover member 12 are pressurized between the pressure mold 20 and the molding tool 25. In this state, the temperature is lowered by natural cooling or by means of a cooling device. Thereupon, the hot-melt adhesive elements 21a are hardened, so that the pad member 11 and the cover member 12 are bonded to each other at a large number of points. After this state is held for a given period of time, the seat 10 is disengaged from the molding tool 25.

In the manufacturing method for the seat 10 described above, the hot-melt web 21 is heated to be melted before the pad member 11 and the cover member 12 are contact-bonded. In this case, the melted hot-melt adhesive elements 21a are not bound with the members 11 and 12. Accordingly, the melted adhesive elements 21a can be spread like mist drops.

Since the pad member 11 and the cover member 12 are contact-bonded after the hot-melt adhesive elements 21a are distributed like mist drops, the adhesive elements 21a can be prevented from becoming a continuous film or net as they harden. In this case, the pad member 11 and the cover member 12 are bonded to each other at a large number of points. Accordingly, the resulting seat ensures a feeling of soft sitting and an improved surface touch or feel.

The hot-melt adhesive elements 21a of this embodiment have the form of the web 21, an aggregate of fibers, before they are melted. Unlike a conventional spreadable hot-melt adhesive, therefore, the adhesive elements 21a are free from variation in build-up or thickness. Thus, the adhesive elements 21a can be uniformly supplied between the pad member 11 and the cover member 12 with ease.

Since the hot-melt web 21 is in the form of a sheet, it can be set in the pad member 11 and the cover member 12 without requiring use of any special equipment. Since the web 21 never reacts or hardens with the passage of time, moreover, it can be handled with ease.

The hot-melt adhesive elements 21a melted and spread like mist drops in the heating process can immediately secure necessary bonding strength in a manner such that the pad member 11 and the cover member 12 are bonded together as they are cooled for a fixed time or longer. Thus, the necessary cycle time for the manufacture of the seat 10 can be shortened.

In the heating process described above, moreover, the hot-melt webs 21 provided individually on the pad member 11 and the cover member 12 are directly heated by means of the heaters 30 and 31 on the web side. Accordingly, the web 21 can be heated with a small quantity of heat. Since the hot-melt web 21 is directly heated from the inside of the cover member 12, as shown in FIG. 5, the surface of the cover member 12, if made of raised fabric, cannot be flattened.

In the case where the hot-melt webs 21 are provided individually on the pad member 11 and the cover member 12, as in the embodiment described above, the melted hot-melt adhesive elements 21a fit both the members 11 and 12. In this case, the adhesive elements 21a bond to one another in the pressurizing process. Accordingly, the bonding strength becomes higher than in the case where the hot-melt web 21 is located only one of the members 11 and 12.

Thus, according to the embodiment described above, high bonding strength can be obtained even with use of the hot-melt web 21 that has the METSUKE of 40 g/n$^2$ or less. The METSUKE of the web 21 must be increased in order to obtain the same strength of the embodiment by providing the web 21 only on the pad member 11 or the cover member 12. If the METSUKE exceeds 40 g/m$^2$, the manufacture entails a long cycle time, as well as high costs and a long heating time.

It is to be understood, in carrying out the present invention, that the components of the seat, including the material and shape of the hot-melt web, as well as the respective specific forms of the pad member and the cover member, may be variously changed or modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Other modifications of the present invention will be obvious to those skilled in the art in the foregoing teachings. Moreover, while the present invention has been described with reference to specific embodiments and particular details thereof, it is not intended that these details be construed as limiting the scope of the invention, which is defined by the following claims.

It should be understood that the foregoing description is only illustrative of the present invention. Various alternatives and modifications can be devised by those skilled in the art without departing from the invention. Accordingly, the present invention is intended to embrace all such alternatives, modifications and variances of the present invention as defined in the appended claims.

What is claimed is:

1. A method of manufacturing a seat having a pad member bonded to a cover member using hot-melt adhesive elements, said method comprising:
    placing a pre-made web of fibrous hot-melt adhesive elements on at least an outer surface of the pad member or an inner surface of the cover member;
    heating at least the pad member or the cover member together with said pre-made web, thereby melting said pre-made web so that said pre-made web is cut and separated into a plurality of independent adhesive particles by surface tension, said plurality of independent adhesive particles being distributed at least on the outer surface of the pad member or on the inner surface of the cover member; and
    superposing and pressing the pad member and the cover member to bond to each other, after distributing said plurality of independent adhesive particles at least on the outer surface of the pad member or on the inner surface of the cover member.

2. A method of manufacturing a seat according to claim 1, wherein the outer surface of the pad member and the inner surface of the cover member are each provided with said pre-made web of fibrous hot-melt adhesive elements having a density of 40 g/m$^2$ or less.

3. A method of manufacturing a seat having a pad member bonded to a cover member, said method comprising:
    molding a plurality of fibrous hot-melt adhesive elements into a porous web structure;
    locating said porous web structure on a location selected from the group consisting of an outer surface of the pad member, an inner surface of the cover member, and any combinations thereof;
    melting said porous web structure to define a plurality of independent adhesive particles; and
    pressing the outer surface of the pad member and the inner surface of the cover member to each other.

4. The method as in claim 3, wherein said porous web structure has a density of 40 g/m$^2$ or less.

5. The method as in claim 3, wherein each of said plurality of fibrous hot-melt adhesive elements comprise a plurality of turns, and wherein said plurality of independent adhesive particles are defined at said plurality of turns.

6. The method as in claim 3, wherein locating said porous web structure on said location comprises laminating said porous web structure to said location.

* * * * *